US 8,757,491 B2

(12) United States Patent
Yamaguchi

(10) Patent No.: US 8,757,491 B2
(45) Date of Patent: Jun. 24, 2014

(54) IMAGE PROCESSING DEVICE, IMAGE PROCESSING METHOD, AND COMPUTER-READABLE RECORDING MEDIUM STORING IMAGE PROCESSING PROGRAM

(71) Applicant: Fujitsu Limited, Kawasaki (JP)

(72) Inventor: Nobuyasu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/692,484

(22) Filed: Dec. 3, 2012

(65) Prior Publication Data

US 2013/0153661 A1 Jun. 20, 2013

(30) Foreign Application Priority Data

Dec. 19, 2011 (JP) ................. 2011-277308

(51) Int. Cl.
*G06K 7/00* (2006.01)
*G06K 7/10* (2006.01)
*G06K 7/14* (2006.01)
*G06K 15/00* (2006.01)
*G06F 3/12* (2006.01)

(52) U.S. Cl.
USPC ........ 235/462.06; 235/462.01; 235/454; 235/439; 235/435; 358/1.18; 358/1.1

(58) Field of Classification Search
USPC ............ 235/462.06, 494, 435, 439, 454, 235/462.01; 358/1.1, 1.18
See application file for complete search history.

(56) References Cited

U.S. PATENT DOCUMENTS

| | | | |
|---|---|---|---|
| 6,062,475 A * | 5/2000 | Feng | 235/462.06 |
| 7,328,847 B1 | 2/2008 | Shen et al. | |
| 2005/0109846 A1 | 5/2005 | Lubow | |
| 2008/0023546 A1 | 1/2008 | Myodo et al. | |
| 2009/0103803 A1 | 4/2009 | Kumar et al. | |
| 2009/0289121 A1* | 11/2009 | Maeda et al. | 235/462.06 |
| 2011/0026081 A1* | 2/2011 | Hamada et al. | 358/1.18 |

FOREIGN PATENT DOCUMENTS

| | | |
|---|---|---|
| EP | 2280378 A1 | 2/2011 |
| JP | 2006-180342 | 7/2006 |
| JP | 2011-2597 | 1/2011 |

OTHER PUBLICATIONS

Extended European Search Report issued Apr. 12, 2013 in corresponding European Patent Application No. 12194791.5.

* cited by examiner

*Primary Examiner* — Christle I Marshall
*Assistant Examiner* — Claude J Brown
(74) *Attorney, Agent, or Firm* — Staas & Halsey LLP

(57) ABSTRACT

An image processing device includes: a memory that stores a program including a procedure; and a processor that executes the program, the procedure including: acquiring an image including a plurality of pixels, and changing luminance of the pixel that is included in either a high luminance part of a barcode region or a low luminance part the barcode region, the barcode region being set on the image, based on a luminance difference between the high luminance part and the low luminance part.

16 Claims, 10 Drawing Sheets

LINE DATA
⇒SMOOTHING PROCESSING

Y AXIS

X AXIS

DIRECTION ORTHOGONAL TO LINE
DATA ACQUISITION DIRECTION
⇒SECOND SMOOTHING PROCESSING

Y AXIS

LINE DATA
⇒FIRST SMOOTHING PROCESSING

X AXIS

BEFORE ADJUSTMENT

IMAGE CAPTURING DATE AND TIME: 6/30/2011 13:15:30
DATA STORED IN BARCODE: 110630131530

AFTER ADJUSTMENT

RECOGNIZE BARCODE AND
EXTRACT INFORMATION
ABOUT DATE AND TIME

20110630131530

⇩

RETRIEVE IMAGE ELECTRONIC
DATA WITH THIS VALUE

⇩

PERFORM IMAGE MATCHING

DETERMINE LOGICAL COORDINATE
AXES AT THE TIME OF DISPLAY ON
THE BASIS OF IMAGE CAPTURING
POSITION OF BARCODE

# IMAGE PROCESSING DEVICE, IMAGE PROCESSING METHOD, AND COMPUTER-READABLE RECORDING MEDIUM STORING IMAGE PROCESSING PROGRAM

CROSS-REFERENCE TO RELATED APPLICATION

This application is based upon and claims the benefit of priority of the prior Japanese Patent Application No. 2011-277308, filed on Dec. 19, 2011, the entire contents of which are incorporated herein by reference.

FIELD

The embodiment discussed herein is related to an image processing device, an image processing method, and a computer-readable recording medium storing an image processing program.

BACKGROUND

Image data obtained by capturing the image of a subject with a digital camera is stored in a personal computer (PC) or a mobile terminal or is stored with a network service. An image corresponding to the image data is printed on a sheet of paper as appropriate. For example, the sheet of paper is put in an album or is provided for a friend or an acquaintance.

A viewer who has seen the image printed on the sheet of paper may want to know where the original image data corresponding to the image is stored or when and where the image capturing has been performed. In such a case, the viewer causes pieces of image data stored in a PC and a mobile terminal and pieces of image data stored with a network service to be displayed on a display screen as images one by one and visually checks them until the target image data is found.

There is a technique for encoding the header part of a received e-mail to generate a barcode, merging the barcode into an image on which the body part of the e-mail is output, and printing the image (see, for example, Japanese Laid-open Patent Publication No. 2006-180342). In this technique, processing for decoding the barcode included in image data corresponding to a read document to acquire the header part and transmitting the image data to a transmission destination determined on the basis of the acquired header part is performed.

There is also a technique for printing a barcode (QR code (registered trademark)) on a photograph (see, for example, Japanese Laid-open Patent Publication No. 2011-2597). In this technique, an average value H of background colors around a position at which a QR code is to be placed is calculated. At the time of generation of a QR code, on the basis of a luminance level difference H' with which a QR code becomes readable, a white part of the QR code is set to H+H' and a black part of the QR code is set to H−H'.

SUMMARY

According to an aspect of the invention, an image processing device includes: a memory that stores a program including a procedure; and a processor that executes the program, the procedure including: acquiring an image including a plurality of pixels, and changing luminance of the pixel that is included in either a high luminance part of a barcode region or a low luminance part the barcode region, the barcode region being set on the image, based on a luminance difference between the high luminance part and the low luminance part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

As described previously, in a case where an image and a barcode indicating relevant information about the image are printed on a sheet of paper at the same time with a technique for providing information with a barcode, the relevant information can be obtained when the barcode is read. However, barcodes are generally monochrome images each including a white part and a black part. In a case where an image into which a barcode has been merged is printed on a sheet of paper, a part of the image where the barcode is printed becomes pronounced and the appearance of the image is spoiled. As described previously, in a case where a white part of a barcode is set to the average value H of background colors around the barcode+the luminance level difference H' and a black part of the barcode is set to the average value H−the luminance level difference H', the barcode is less pronounced. However, the original appearance (gradation) of a part of the image where the barcode is present is spoiled.

The increase in the amount of information represented by a barcode increases the size of the barcode. Accordingly, in a case where the amount of information to be attached to an image with a barcode is increased, a barcode print area is increased. As a result, the simultaneous printing of an image and a barcode pronouncedly spoils the appearance of the image. For this reason, the amount of information attachable to an image with a barcode is limited, and it is difficult to attach large amounts of information (for example, image data of an original image) to an image.

It is an object of the present disclosure to easily acquire information about a printed image without spoiling the appearance of the printed image.

Figure 1:
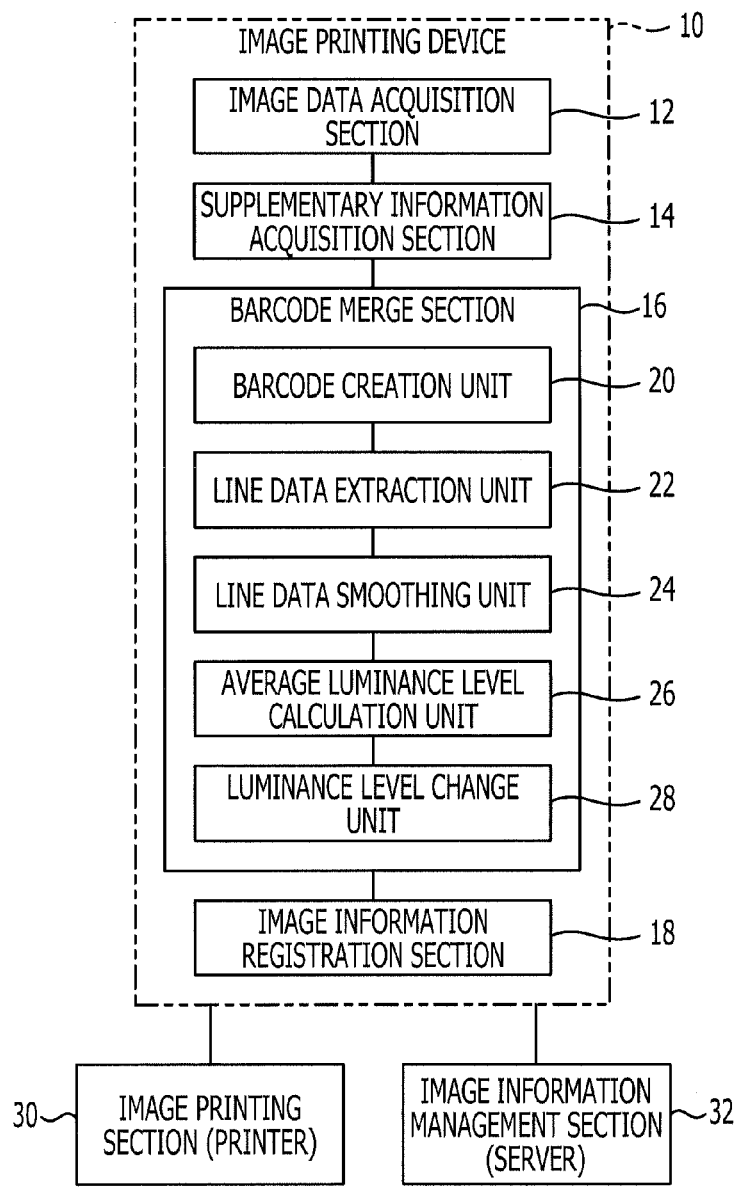
FIG. 1 is a functional block diagram of an image printing device according to an embodiment of the present disclosure.

An exemplary embodiment of the present disclosure will be described in detail below with reference to the accompanying drawings. FIG. 1 illustrates an image printing device 10 according to this embodiment. The image printing device 10 is one of image processing devices. The image printing device 10 is a device for printing an image on a sheet of paper, and is included in one of an information apparatus such as a personal computer (PC) and a printing apparatus such as a printer that are connected to each other. In this embodiment, the image printing device 10 is included in an information apparatus. The image printing device 10 includes an image data acquisition section 12, a supplementary information acquisition section 14, a barcode merge section 16, and an image information registration section 18. An image printing section 30 realized by a printer 56 (see FIG. 2) and an image information management section 32 realized by a server 58 (see FIG. 2) are connected to the image printing device 10.

The image data acquisition section 12 acquires the image data of an image captured by an image capturing unit such as a digital camera or the image data of an image read by a reading unit such as an image scanner. The image capturing unit may be included in the information apparatus including the image printing device 10. In this case, the image data acquisition section 12 may include the image capturing unit. For example, in a case where the image capturing unit or the reading unit is connected to the information apparatus via a communication cable, the image data acquisition section 12 may be a communication section that is included in the information apparatus and acquires image data from the image capturing unit or the reading unit via the communication table.

Image data acquired by the image data acquisition section 12 includes attribute information, for example, information about an image capturing date and time (or an image reading date and time) and information about image capturing conditions (or image reading conditions). The supplementary information acquisition section 14 extracts supplementary information to be attached to an image to be printed on a sheet of paper as a barcode from the attribute information added to the image data acquired by the image data acquisition section 12. As the image data acquired by the image data acquisition section 12, an image data file in a known format such as a Jpeg format or a bitmap (BMP) format can be used. For example, in a case where image data in a Jpeg format is used, various pieces of attribute information including information about an image capturing data and time are included in the image data as Exif header information. The supplementary information acquisition section 14 can extract supplementary information from the header information. In a case where image data in a BMP format is used, attribute information is added as attribute information of an image data file. The supplementary information acquisition section 14 can extract supplementary information from the added attribute information.

The supplementary information is preferably information usable for the retrieval of image data and attribute information, that is, information with which corresponding information can be uniquely specified. In this embodiment, an exemplary case in which the image data acquisition section 12 acquires image data from the image capturing unit and the supplementary information acquisition section 14 extracts information about an image capturing data and time as supplementary information will be described. However, another piece of information may be used as supplementary information.

The barcode merge section 16 creates a barcode representing the supplementary information acquired by the supplementary information acquisition section 14 and merges the created barcode with the image data acquired by the image data acquisition section 12. The barcode merge section 16 includes a barcode creation unit 20, a line data extraction unit 22, a line data smoothing unit 24, an average luminance level calculation unit 26, and a luminance level change unit 28.

The barcode creation unit 20 creates a barcode representing the supplementary information acquired by the supplementary information acquisition section 14. The line data extraction unit 22 extracts data of each line included in a barcode merge region, into which the barcode created by the barcode creation unit 20 is to be merged, in an image corresponding to the image data acquired by the image data acquisition section 12. The line data smoothing unit 24 performs smoothing processing on the one-line data extracted by the line data extraction unit 22. The average luminance level calculation unit 26 calculates an average luminance level (a luminance level moving average) from the one-line data that has been subjected to the smoothing processing performed by the line data smoothing unit 24.

The luminance level change unit 28 determines whether each point of a line corresponding to the one-line data corresponds to a black bar or a white bar of the barcode created by the barcode creation unit 20 and changes the luminance level of the point on the basis of a result of the determination and the average luminance level calculated by the average luminance level calculation unit 26. The change in the luminance level is performed on only a part of the line between a point corresponding to a black bar and a point corresponding to a white bar where a luminance level difference suitable for the reading of the barcode is not present.

The above-described pieces of processing are performed on all lines included in the barcode merge region by the line data extraction unit 22, the line data smoothing unit 24, the average luminance level calculation unit 26, and the luminance level change unit 28, so that the barcode representing the supplementary information is merged into the barcode merge region in the image. The image data of the image into which the barcode has been merged is output to the image printing section 30. The image printing section 30 prints the image (including the barcode) represented by the received image data on a sheet of paper.

The image information registration section 18 associates each of the image data acquired by the image data acquisition section 12 and the attribute information added to the image data with the supplementary information extracted by the supplementary information acquisition section 14 and outputs them to the image information management section 32. Pieces of information output to the image information management section 32 are registered in an image information database (DB) 60 (see FIG. 2) by the image information management section 32.

Figure 2:
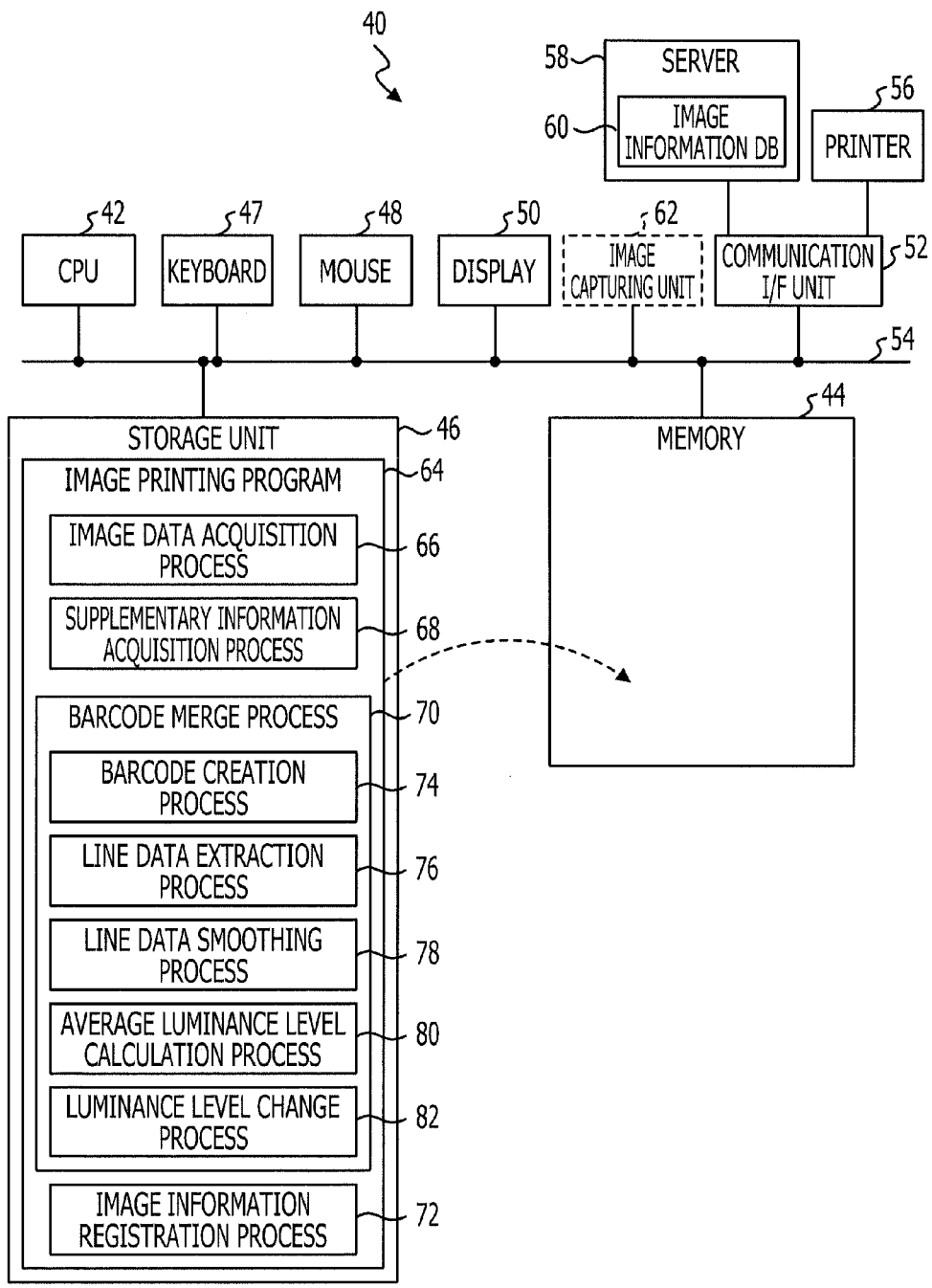
FIG. 2 is a schematic block diagram of a computer functioning as an image printing device.

The image printing device 10 can be realized by, for example, a computer (computer in an information apparatus) 40 illustrated in FIG. 2. The computer 40 includes a CPU 42, a memory 44, a nonvolatile storage unit 46, a keyboard 47, a mouse 48, a display 50, and a communication interface (I/F) 52 which are connected to one another via a bus 54. The computer 40 is connected to the printer 56 and the server 58 via the communication I/F 52. The computer 40 may further include an image capturing unit 62 represented by a broken line in FIG. 2.

The storage unit 46 can be realized by a hard disk drive (HDD) or a flash memory. The storage unit 46 that is a recording medium stores an image printing program 64 that causes the computer 40 to function as the image printing device 10. The CPU 42 reads the image printing program 64 from the storage unit 46, decompresses the image printing program 64 in the memory 44, and sequentially performs processes included in the image printing program 64.

The image printing program 64 includes an image data acquisition process 66, a supplementary information acquisition process 68, a barcode merge process 70, and an image information registration process 72. The CPU 42 performs the image data acquisition process 66, thereby operating as the image data acquisition section 12 illustrated in FIG. 1. The CPU 42 performs the supplementary information acquisition process 68, thereby operating as the supplementary information acquisition section 14 illustrated in FIG. 1. The CPU 42 performs the barcode merge process 70, thereby operating as the barcode merge section 16 illustrated in FIG. 1. The CPU 42 performs the image information registration process 72, thereby operating as the image information registration section 18 illustrated in FIG. 1.

More specifically, the barcode merge process 70 includes a barcode creation process 74, a line data extraction process 76, a line data smoothing process 78, an average luminance level calculation process 80, and a luminance level change process 82. The CPU 42 performs the barcode creation process 74, thereby operating as the barcode creation unit 20 illustrated in FIG. 1. The CPU 42 performs the line data extraction process 76, thereby operating as the line data extraction unit 22 illustrated in FIG. 1. The CPU 42 performs the line data smoothing process 78, thereby operating as the line data smoothing unit 24 illustrated in FIG. 1. The CPU 42 performs the average luminance level calculation process 80, thereby operating as the average luminance level calculation unit 26 illustrated in FIG. 1. The CPU 42 performs the luminance level change process 82, thereby operating as the luminance level change unit 28 illustrated in FIG. 1.

Thus, the computer 40 functions as the image printing device 10 by executing the image printing program 64. The image printing program 64 is an example of an image printing program according to an embodiment of the present disclosure.

The image printing device 10 may be realized by, for example, a semiconductor integrated circuit such as an application specific integrated circuit (ASIC).

Figure 3:
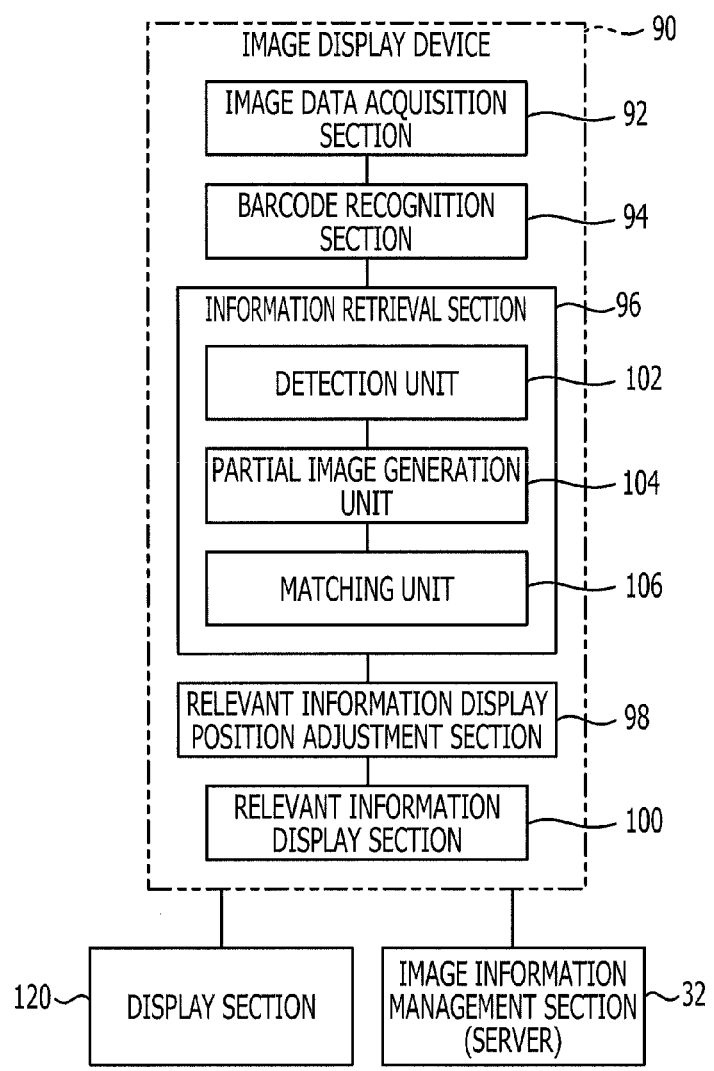
FIG. 3 is a functional block diagram of an image display apparatus according to an embodiment of the present disclosure.

Next, an image display device 90 according to this embodiment will be described with reference to FIG. 3. The image display device 90 is a device for reading a barcode merged into an image printed on a sheet of paper by the image printing section 30 and displaying the image with relevant information, and is an example of an image processing device according to an embodiment of the present disclosure. The image display device 90 includes an image data acquisition section 92, a barcode recognition section 94, an information retrieval section 96, a relevant information display position adjustment section 98, and a relevant information display section 100. The image display device 90 can be included in, for example, a mobile terminal such as a mobile telephone (a mobile terminal can function as the image display device 90). Alternatively, a computer such as a PC can function as the image display device 90. A display section (a display with a touch panel illustrated in FIG. 4) 120 for displaying an image or the like and the image information management section 32 realized by the server 58 (see FIG. 4) are connected to the image display device 90.

The image data acquisition section 92 acquires, from an image capturing unit 122 (see FIG. 4), the image data of an image obtained by causing the image capturing unit 122 to capture an image printed on a sheet of paper by the image printing section 30. In this embodiment, the image capturing unit 122 may be included in a mobile terminal including the image display device 90. In this case, the image data acquisition section 92 may include the above-described image capturing unit. For example, in a case where the image capturing unit is connected to the mobile terminal via a communication cable, the image data acquisition section 92 may be a communication section that is included in the mobile terminal and receives the image data of an image captured by the image capturing unit via the communication cable.

In this embodiment, an image printed on a sheet of paper by the image printing section 30 is an image into which a barcode has been merged. The barcode recognition section 94 recognizes a barcode in an image represented by image data acquired by the image data acquisition section 92.

The information retrieval section 96 searches the image information DB 60 (see FIG. 2) in the image information management section 32 for relevant information about the image with information (supplementary information) represented by the barcode recognized by the barcode recognition section 94. The information retrieval section 96 includes a detection unit 102, a partial image generation unit 104, and a matching unit 106.

The detection unit 102 detects the image capturing region, the inclination amount, and the rotation angle of the image captured by the image capturing unit 122 on the basis of the geometric shape of a barcode print region in the image represented by the image data acquired by the image data acquisition section 92.

In a case where pieces of relevant information about a plurality of images are extracted from the image information DB 60, the partial image generation unit 104 generates a partial image used for matching (hereinafter referred to as matching partial image). More specifically, the partial image generation unit 104 extracts a matching partial image from the image represented by the image data acquired by the image data acquisition section 92 on the basis of the image capturing region detected by the detection unit 102, and corrects the inclination and rotation of the extracted partial image on the basis of the inclination amount and the rotation angle detected by the detection unit 102. As a result, a matching partial image is generated.

In a case where pieces of relevant information about a plurality of images are extracted from the image information DB 60, the matching unit 106 performs image matching by comparing each of extracted images and the matching partial image generated by the partial image generation unit 104. More specifically, the image matching is performed on a part of each of these retrieved images corresponding to the matching partial image which is determined on the basis of a barcode region (set in advance). Relevant information associated with one of the images whose similarity level is the highest among them and is equal to or larger than a certain value is output.

The relevant information display position adjustment section 98 determines the display position (display position on a display surface of the display section 120) of the relevant information extracted by the information retrieval section 96 on the basis of the position of the barcode recognized by the barcode recognition section 94. The relevant information display section 100 displays the image represented by the image data acquired by the image data acquisition section 92 on the display section 120 and displays the relevant information extracted by the information retrieval section 96 at the display position determined by the relevant information display position adjustment section 98.

Figure 4:
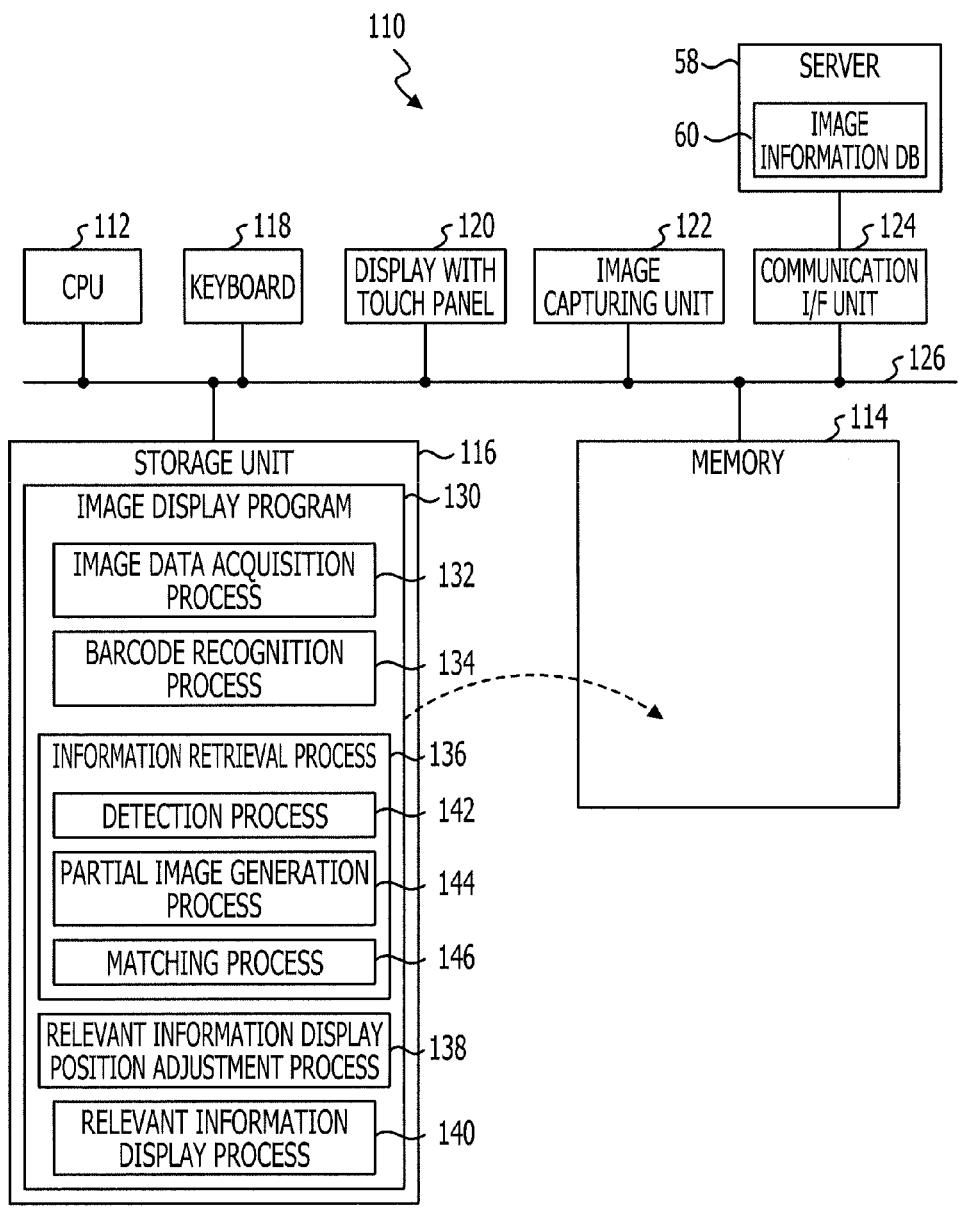
FIG. 4 is a schematic block diagram of a computer functioning as an image display apparatus.

The image display device 90 can be realized by, for example, a computer (a computer included in a mobile apparatus) 110 illustrated in FIG. 4. The computer 110 includes a CPU 112, a memory 114, a nonvolatile storage unit 116, a keyboard 118, the display 120 with a touch panel, the image capturing unit 122, and a communication I/F 124 that are connected to one another via a bus 126. The computer 110 is connected to the server 58 via the communication I/F 124.

The storage unit 116 can be realized by a hard disk drive (HDD) or a flash memory. The storage unit 116 that is a recording medium stores an image display program 130 that causes the computer 110 to function as the image display device 90. The CPU 112 reads the image display program 130 from the storage unit 116, decompresses the image display program 130 in the memory 114, and sequentially performs processes included in the image display program 130.

The image display program 130 includes an image data acquisition process 132, a barcode recognition process 134, an information retrieval process 136, a relevant information display position adjustment process 138, and a relevant information display process 140. The CPU 112 performs the image data acquisition process 132, thereby operating as the image data acquisition section 92 illustrated in FIG. 3. The CPU 112 performs the barcode recognition process 134, thereby operating as the barcode recognition section 94 illustrated in FIG. 3. The CPU 112 performs the information retrieval process 136, thereby operating as the information retrieval section 96 illustrated in FIG. 3. The CPU 112 performs the relevant information display position adjustment process 138, thereby operating as the relevant information display position adjustment section 98 illustrated in FIG. 3. The CPU 112 performs the relevant information display process 140, thereby operating as the relevant information display section 100 illustrated in FIG. 3.

More specifically, the information retrieval process 136 includes a detection process 142, a partial image generation process 144, and a matching process 146. The CPU 112 performs the detection process 142, thereby operating as the detection unit 102 illustrated in FIG. 3. The CPU 112 performs the partial image generation process 144, thereby operating as the partial image generation unit 104 illustrated in FIG. 3. The CPU 112 performs the matching process 146, thereby operating as the matching unit 106 illustrated in FIG. 3.

Thus, the computer 110 functions as the image display device 90 by executing the image display program 130. The image display program 130 is an example of an image processing program according to an embodiment of the present disclosure.

The image display device 90 may be realized by, for example, a semiconductor integrated circuit such as an application specific integrated circuit (ASIC).

Next, operations according to this embodiment will be described. The image printing device 10 according to this embodiment has a function of merging a barcode representing supplementary information into an image to be printed on a sheet of paper. A user who wants an image printed on a sheet of paper may want to know the storage location of image data of the image and relevant information (an image capturing date and time and an image capturing location) about the image. In preparation for this, the user instructs the image printing device 10 to perform printing using the above-described barcode merge function.

Figure 5:
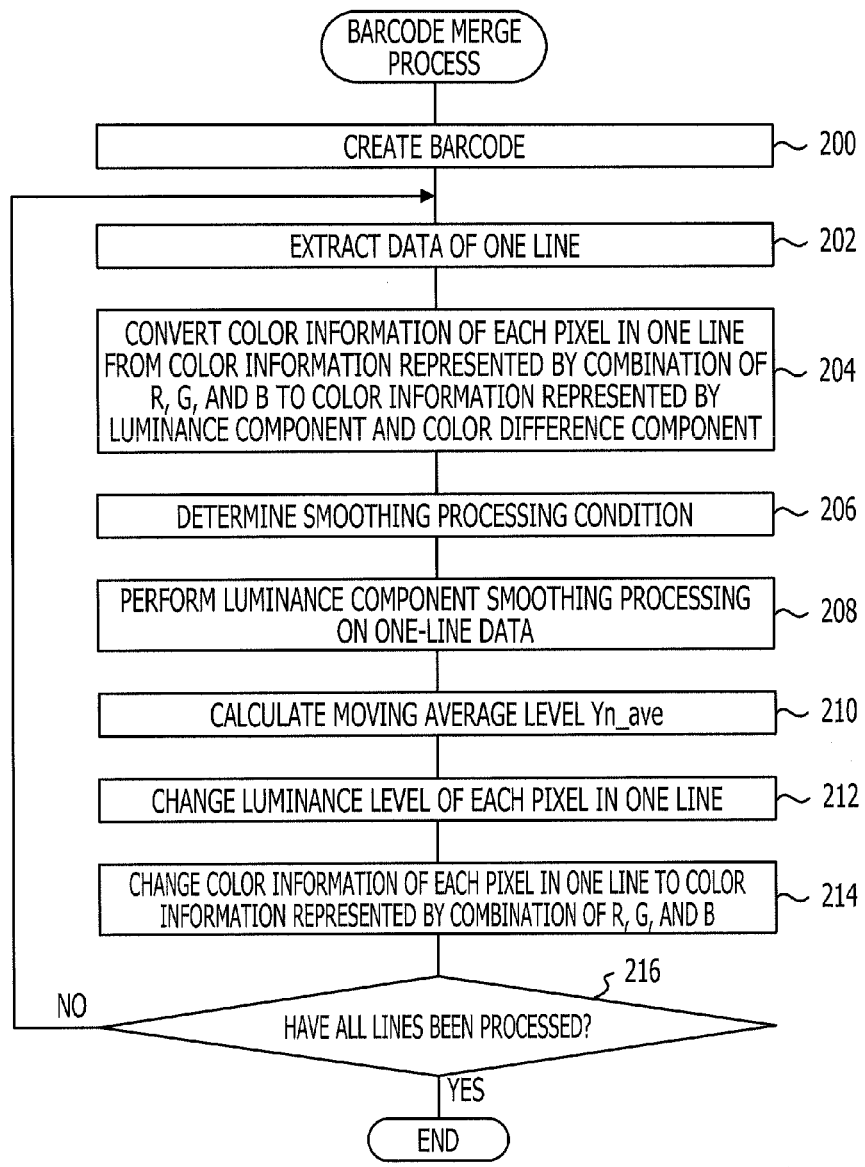
FIG. 5 is a flowchart illustrating an example of a barcode merge process performed by a barcode merge section in an image printing device.

The image data acquisition section 12 in the image printing device 10 acquires image data of an image to be printed from the image capturing unit or the reading unit. The supplementary information acquisition section 14 in the image printing device 10 extracts, from attribute information added to the image data acquired by the image data acquisition section 12, supplementary information (for example, in this embodiment, an image capturing date and time) to be attached to the image to be printed on a sheet of paper as a barcode. The barcode merge section 16 performs a barcode merge process illustrated in FIG. 5. The barcode merge process will be described below.

Figure 6A:
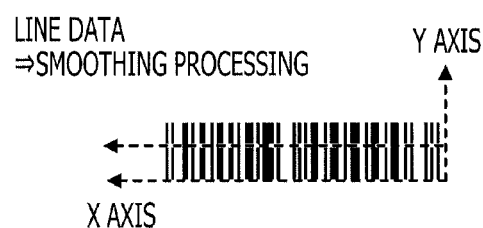
FIGS. 6A and 6B are schematic diagrams illustrating a direction in which smoothing processing is performed for a barcode.

In step 200, the barcode creation unit 20 in the barcode merge section 16 creates a barcode representing supplementary information acquired by the supplementary information acquisition section 14. The barcode creation unit 20 may create a one-dimensional barcode (see FIG. 6A) or a two-dimensional barcode (see FIG. 6B) as a barcode representing supplementary information. An exemplary case in which a one-dimensional barcode is created will be described below. The amount of information stored in a one-dimensional barcode is smaller than that stored in a two-dimensional barcode. However, since only information about an image capturing date and time is stored in a barcode as supplementary information in this embodiment, a one-dimensional barcode can store the supplementary information. In a one-dimensional barcode, white bars and black bars are alternately placed along a barcode reading direction. The numbers of white bars and black bars and the width of each bar are set on the basis of information (supplementary information in this embodiment) to be represented by a barcode.

In step 202, the line data extraction unit 22 in the barcode merge section 16 extracts data of one line along an x-axis (barcode reading direction: see also FIG. 6A) in a barcode merge region in an image represented by image data acquired by the image data acquisition section 12. In this embodiment, the position of the barcode merge region and the size of the barcode merge region (the size of a merge target barcode) are set in advance. The position of the barcode merge region is preferably a position that does not affect the appearance of an image, for example, a lower right corner illustrated in FIG. 7A. In a case where there is a position whose effect on the appearance of an image is less than that of the above-described position, the position of the barcode merge region may be changed.

In step 204, the line data smoothing unit 24 in the barcode merge section 16 converts color information of each pixel included in the line, the data of which has been extracted by the line data extraction unit 22, from color information represented by the combination of R, G, and B to color information represented by a luminance component and a color difference component. In step 206, the line data smoothing unit 24 determines smoothing processing conditions so that a high-frequency variation component having cycles shorter than the minimum bar width of the barcode created by the barcode creation unit 20 is removed. In step 208, the line data smoothing unit 24 performs luminance component smoothing processing on the one-line data along the barcode reading direction (x axis) in accordance with the smoothing processing conditions determined in step 206 (see also FIG. 6A).

Figure 6B:
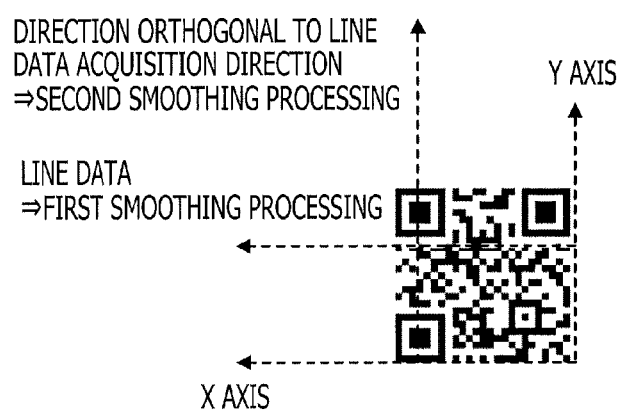

As a result, from the one-line data corresponding to the barcode created by the barcode creation unit 20, a component whose luminance level varies in cycles shorter than the minimum bar width of the barcode is removed. This makes it easier to read the barcode. In a case where a two-dimensional barcode is merged, by also performing similar smoothing processing in a direction orthogonal to the direction in which the line data is obtained as illustrated in FIG. 6B, the ease of reading of the two-dimensional barcode is improved.

In step 210, the average luminance level calculation unit 26 in the barcode merge section 16 calculates a moving average level Yn_ave of luminance components of points (pixels) n in the line represented by the one-line data that has been subjected to the smoothing processing in the line data smoothing unit 24. In step 212, the luminance level change unit 28 in the barcode merge section 16 changes the luminance level of each point (pixel) n in the line represented by the one-line data on the basis of the moving average level Yn_ave calculated by the average luminance level calculation unit 26. The change in the luminance level performed by the luminance level change unit 28 will be described below.

In a case where there is a luminance level difference of 2×Ymin or larger between a white bar (high luminance part) and a black bar (low luminance part) of a barcode, the barcode can be read. Accordingly, the luminance level change unit 28 determines whether an n-th pixel corresponding to a white bar in the line represented by the one-line data satisfies a first conditional expression of Yn−Yn_ave≥Ymin where Yn is the luminance level of the n-th pixel and Yn_ave is the moving average level. In a case where the first conditional expression is satisfied, the luminance level Yn of the n-th pixel is not changed. In a case where the first conditional expression is not satisfied, the luminance level Yn of the n-th pixel is changed to Yn_ave+Ymin. The luminance level change unit 28 determines whether an n-th pixel corresponding to a black bar in the line represented by the one-line data satisfies a second conditional expression of Yn_ave−Yn≥Ymin where Yn is the luminance level of the n-th pixel and Yn_ave is the moving average level. In a case where the second conditional expression is satisfied, the luminance level Yn of the n-th pixel is not changed. In a case where the second conditional expression is not satisfied, the luminance level Yn of the n-th pixel is changed to Yn_ave−Ymin. Thus, the change in the luminance level is performed on processing target one-line data so that the luminance level difference of 2×Ymin or larger is made between a white bar and a black bar.

In step 214, the luminance level change unit 28 converts the color information of the processing target one-line data from the color information represented by a luminance component having a luminance level changed in step 212 and a color difference component to the color information represented by the combination of R, G, and B. In step 216, the barcode merge section 16 determines whether the above-described process has been performed on all lines in the barcode merge region in the image to be printed. In a case where a result of the determination in step 216 is no, the process returns to step 202 and the process from step 202 to step 216 is repeated until a result of the determination in step 216 is yes. In a case where a result of the determination in step 216 is yes, the merge of the barcode into the image to be printed is completed and the barcode merge process ends.

Thus, the change in the luminance level is performed on the barcode merge region in the image to be printed so that the luminance level difference of 2×Ymin or larger is made between a white bar and a black bar along the barcode reading direction. In the above-described process, since a color difference component in the barcode merge region in the image to be printed is not changed and the luminance level of a pixel satisfying barcode readable conditions (the first and second conditional expressions) is not also changed at the time of merge of a barcode, the amount of change in the luminance level and the amount of change in the appearance of an image are minimized. Accordingly, even in a case where a barcode merge region in an image to be printed has gradations, the gradations are kept visible as is apparent from the comparison between a barcode after adjustment illustrated in FIG. 7C and a barcode before adjustment illustrated in FIG. 7B. The above-described process minimizes the degradation in design characteristics of a printed photograph and reduces a user's inhibition about merging a barcode into an image to be printed on a sheet of paper.

Figure 7A:
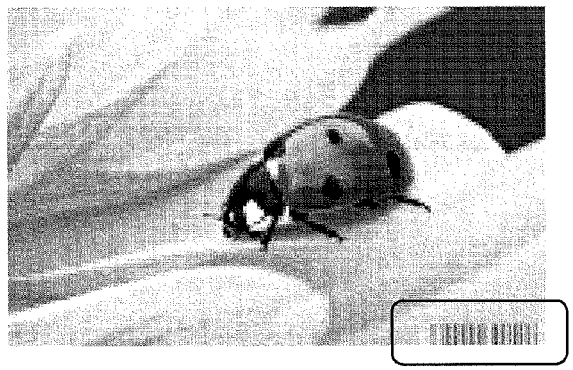
FIGS. 7A, 7B and 7C are diagrams illustrating an example of an image into which a barcode has been merged.
Figure 7B:
Figure 7C:

When the barcode merge process performed by the barcode merge section 16 ends, the image printing device 10 outputs image data of the print target image into which the barcode has been merged in the barcode merge process to the image printing section 30 and instructs the image printing section 30 to print the image on a sheet of paper. The image printing section 30 prints an image represented by the image data input from the image printing device 10 (an image into which a barcode has been merged) on a sheet of paper. As a result, as illustrated in FIG. 7A, an image, into which a barcode has been merged so that the change in the appearance of the image is minimized, is printed on a sheet of paper by the image printing section 30.

The image printed on a sheet of paper by the image printing section 30 (printed photograph) is put in an album or is provided for another user (a friend or an acquaintance of a user who has made an image printing instruction). Image data of the image into which a barcode has been merged may be distributed to a user as a file in an image format and be displayed on a display screen such as an LCD.

The image information registration section 18 associates each of the image data of the image, into which a barcode has been merged by the barcode merge section 16 and which has been printed by the image printing section 30, and attribute information added to the image data with corresponding supplementary information and outputs them to the image information management section 32. Upon receiving the above-described pieces of information from the image information registration section 18, the image information management section 32 associates each of the image data and the attribute information with the corresponding supplementary information and registers them in the image information DB 60. Attribute information registered in the image information DB 60 is not limited to information added to image data in advance, and may be information (for example the title of an image, an image capturing location, and the like) designated by a user who has issued an image printing instruction.

Figure 8:
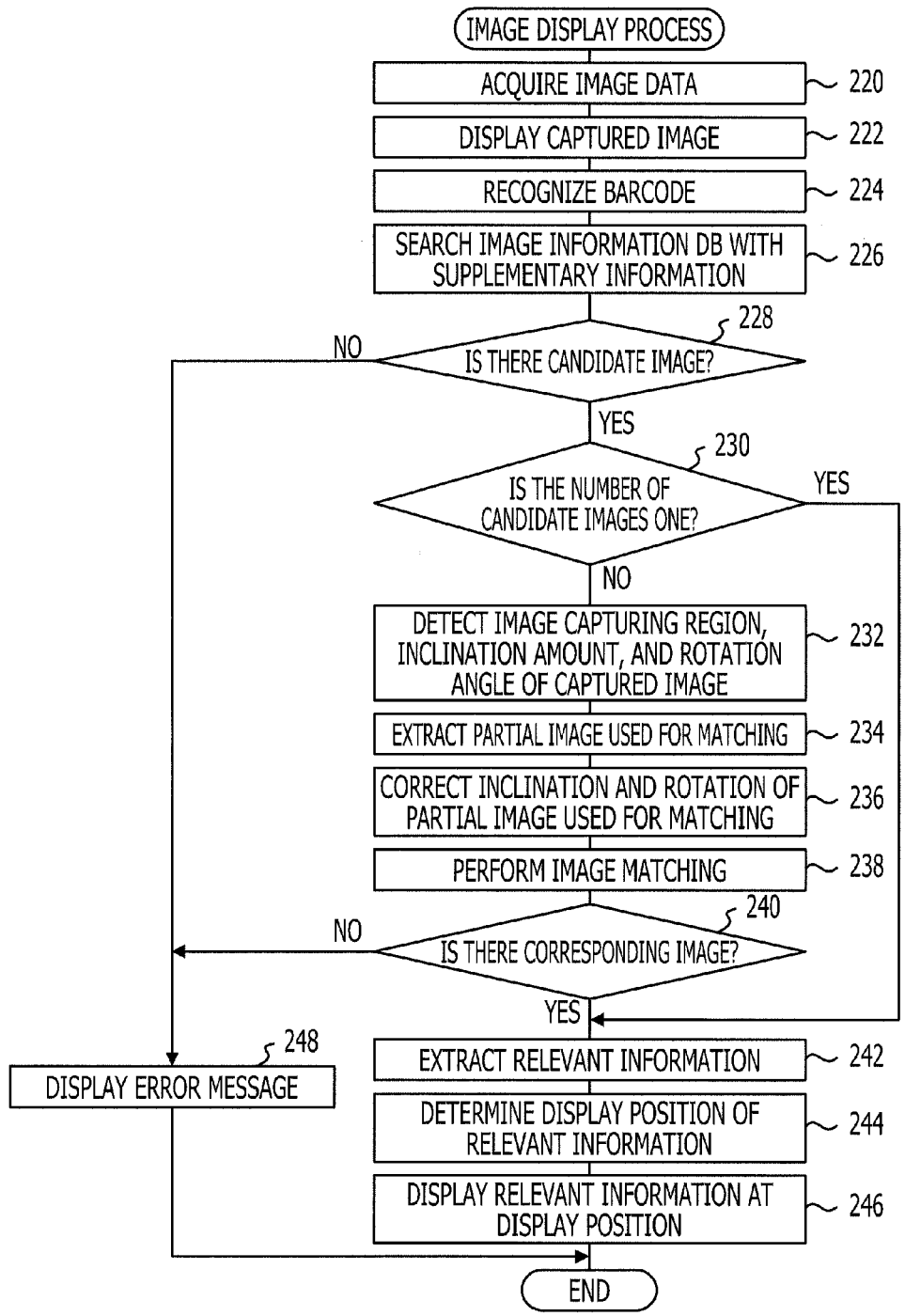
FIG. 8 is a flowchart illustrating an example of an image display process performed by an image display apparatus.

Next, the retrieval of information with a barcode merged into an image printed on a sheet of paper will be described. In a case where a user wants to access original image data of a printed image into which a barcode has been merged or know relevant information such as information about image capturing conditions, the user operates a mobile apparatus including the computer 110, performs image capturing of the image into which the barcode has been merged with the image capturing unit 122, and instructs the image display device 90 to retrieve information relevant to the image captured by the image capturing unit 122. The image display device 90 performs an image display process illustrated in FIG. 8. The image display process will be described below.

Figure 9A:
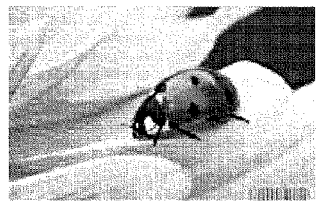
FIGS. 9A, 9B and 9C are diagrams describing the image display process.
Figure 9B:
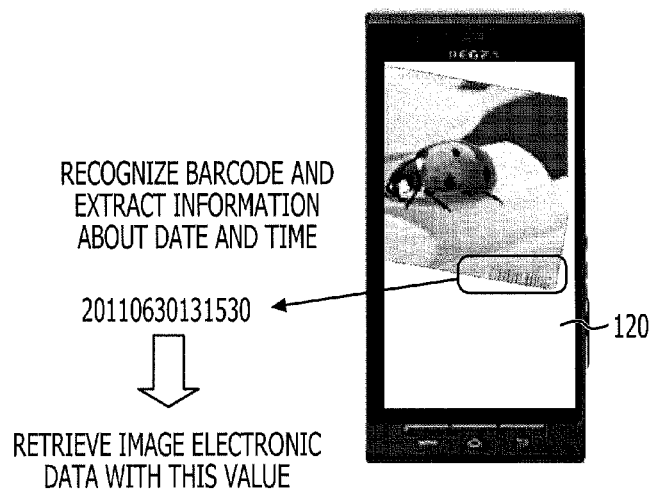

In step 220, the image data acquisition section 92 in the image display device 90 acquires, from the image capturing unit 122, image data obtained in image capturing performed by the image capturing unit 122. In step 222, the image display device 90 displays an image represented by the image data acquired by the image data acquisition section 92 on the display section 120. For example, in a case where the image data acquisition section 92 acquires image data corresponding to an image illustrated in FIG. 9A, the image is displayed on the display section 120 as illustrated in FIG. 9B.

In step 224, the barcode recognition section 94 in the image display device 90 recognizes a barcode print region including a barcode in the image represented by the image data acquired by the image data acquisition section 92 and reads the barcode in the barcode print region along a barcode reading direction, thereby recognizing supplementary information represented by the barcode.

In step 226, the information retrieval section 96 in the image display device 90 notifies the image information management section 32 (the server 58) of the supplementary information recognized by the barcode recognition section 94 and instructs the image information management section 32 to retrieve information associated with the supplementary information in the image information DB 60. The image information management section 32 uses the supplementary information (an image capturing date and time) notified by the image display device 90 to retrieve information associated with the supplementary information, that is, information relevant to the image displayed on the display section 120, in the image information DB 60. The image information management section 32 notifies the image display device 90 of a retrieval result and information (the address of storage location of the image data) extracted in the retrieval.

After the image information management section 32 has transmitted the notification about the retrieval result, the process proceeds from step 226 to step 228. In step 228, the information retrieval section 96 determines whether there is a candidate image associated with relevant information extracted in the retrieval performed by the image information management section 32. In a case where a result of the determination in step 228 is no, there is no information relevant to the image displayed on the display section 120 in the image information DB 60. Accordingly, the process proceeds to step 248. In step 248, the relevant information display section 100 in the image display device 90 displays an error message that relevant information is not registered on the display section 120. The image display process ends.

In a case where a result of the determination in step 228 is yes, the process proceeds to step 230. In step 230, the information retrieval section 96 determines whether the number of candidate images for which relevant information has been extracted in the retrieval performed by the image information management section 32 is one. In this embodiment, the image capturing date and time used by the image information management section 32 at the time of retrieval is unique information with which corresponding information is uniquely specified almost without fail (a single image candidate is extracted). In a case where a result of the determination in step 230 is yes, the process proceeds to step 242.

On the other hand, for example, in a case where the image displayed on the display section 120 is one of images captured with a continuous image capturing function of capturing a plurality of images per second, a plurality of candidate images may be extracted at the time of retrieval performed with the image capturing date and time. In addition, in a case where pieces of information about images captured by a plurality of persons are registered in the image information DB 60, a plurality of candidate images may be extracted at the time of retrieval performed with the image capturing date and time. In such a case, a result of the determination in step 230 is no and the process proceeds to step 232.

Figure 10A:
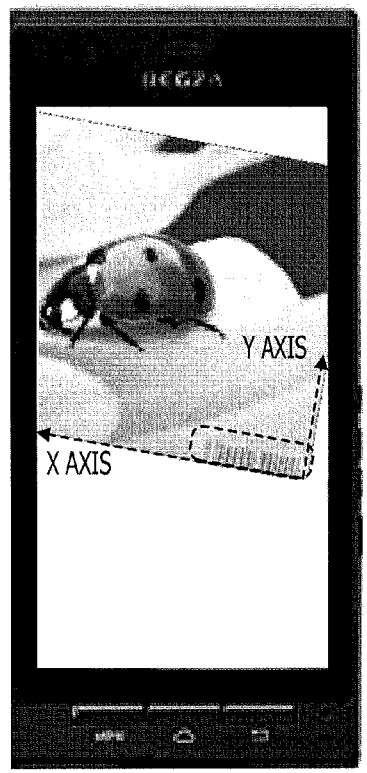
FIGS. 10A and 10B are diagrams describing the image display process.

In steps 232 to 240, an image corresponding to the image displayed on the display section 120 is extracted from a plurality of candidate images by image matching. In step 232, the detection unit 102 in the information retrieval section 96 detects an image capturing region, an inclination amount, and a rotation angle of the image represented by the image data acquired by the image data acquisition section 92. The inclination amount and the rotation angle can be detected on the basis of the geometric shape of the barcode print region in which the barcode is printed. More specifically, for example, as illustrated in FIG. 10A, among four sides that are outer edges of an image, two sides between which a corner of the barcode print region is enclosed are approximated by straight lines. The straight lines are individually set as an X axis and a Y axis. An angle between a pixel arrangement direction in the image capturing unit 122 (horizontal or vertical direction) and the X or Y axis can be detected as the rotation angle of the image. Since the angle between the X axis and the Y axis is changed in accordance with the inclination amount of an image (the inclination of an image capturing direction around a horizontal axis), the angle between the X axis and the Y axis can be detected as the inclination amount of the image.

Figure 9C:
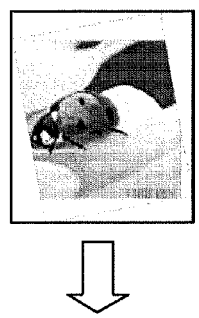

In step 234, the partial image generation unit 104 in the information retrieval section 96 extracts a matching partial image from the image represented by the image data acquired by the image data acquisition section 92 on the basis of the image capturing region detected by the detection unit 102 and the barcode print region. In step 236, the partial image generation unit 104 in the information retrieval section 96 corrects the inclination and rotation of the extracted matching partial image on the basis of the inclination amount and the rotation angle detected by the detection unit 102 by image processing such as affine transformation. As a result, for example, a partial image available for image matching is generated as illustrated in FIG. 9C.

In step 238, the matching unit 106 in the information retrieval section 96 performs image matching processing for computing the similarity level between the matching partial image and each of corresponding parts of the candidate images. The computation of the similarity level between a single image candidate and the matching partial image is performed by, for example, performing the summation of differences between only corresponding pixels while changing the relative position of the image candidate and the matching partial image. At a position at which a result of the summation of the differences becomes the minimum value, the maximum similarity level is obtained. By performing this processing on each of a plurality of candidate images, the similarity level between the image candidate and a partial image is calculated. The image matching may be performed with another method.

In general, in a case where an image used for image matching has a distortion after being inclined or rotated or is partly lacked, the performance of the image matching is reduced. By performing image matching after correcting the inclination and rotation of a matching partial image as described previously, the effect of the inclination and rotation of the matching partial image can be removed and the processing amount of image matching can be reduced. As a result, high-accuracy and high-speed image matching can be performed.

In step 240, the information retrieval section 96 determines whether an image corresponding to the image displayed on the display section 120 has been extracted by determining whether the maximum similarity level detected by the matching unit 106 is equal to or larger than a certain value. In a case where a result of the determination in step 240 is no, the process proceeds to step 248 since it can be determined that all of the candidate images do not correspond to the image displayed on the display section 120. In step 248, the relevant information display section 100 in the image display device 90 displays a message that relevant information is not registered on the display section 120. The image display process ends.

In a case where a result of the determination in step 240 is yes, the process proceeds to step 242. A single image candidate corresponding to the image displayed on the display section 120 is specified when the process proceeds to step 242. In step 242, the information retrieval section 96 selects the relevant information of a single image candidate corresponding to the image displayed on the display section 120 from among the pieces of information transmitted from the image information management section 32. In step 244, the relevant information display position adjustment section 98 in the image display device 90 determines the display position of relevant information on the display surface of the display section 120 so that the relevant information does not overlap the image displayed on the display section 120. The relevant information display position adjustment section 98 determines the display position of the relevant information on the basis of the image capturing region, the inclination amount, and the rotation angle of the image detected by the detection unit 102.

Figure 10B:
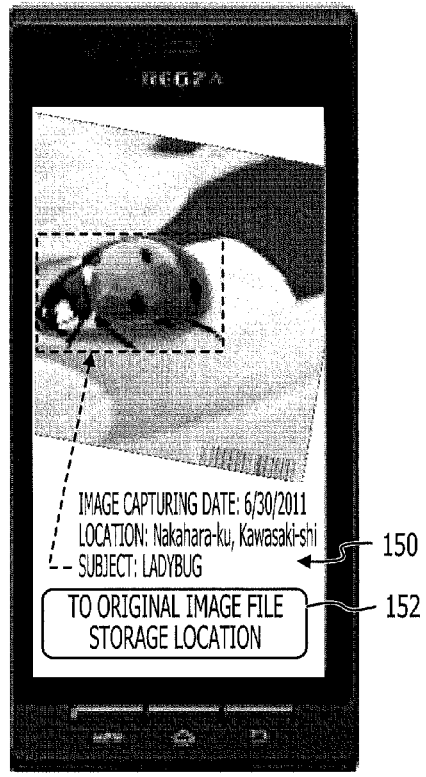

In step 246, for example, as illustrated in FIG. 10B, the relevant information display section 100 in the image display device 90 displays relevant information 150 at the display position on the display surface of the display section 120 determined by the relevant information display position adjustment section 98. In an example illustrated in FIG. 10B, an image capturing day, an image capturing location, and a subject name are displayed as the relevant information 150. However, as the relevant information 150, other information, for example, image capturing conditions, may be displayed. A user can recognize the information relevant to the image, into which the barcode has been merged and which has been printed on a sheet of paper, by visually checking the relevant information 150 displayed on the display section 120. Since the relevant information 150 is displayed at a position that does not overlap the image on the display surface of the display section 120, the visibility of the relevant information 150 is improved and a user can quickly understand the relevant information 150.

In the example illustrated in FIG. 10B, a button 152 into which an image data storage location notified by the image information management section 32 is embedded is also displayed. In a case where a user wants to access the image data of the image, into which the barcode has been merged and which has been printed on a sheet of paper, the user selects the button 152. As a result, the access to the address (the storage location of the image data) embedded into the button 152 is performed, and the user can issue an image data download instruction.

Thus, in the above-described image display process, a user performs only an image capturing operation of capturing an image, into which a barcode has been merged and which has been printed on a sheet of paper, when the user wants to access the original image data of the image or know relevant information such as information about image capturing conditions of the image. As a result, the display of the relevant information is performed. Accordingly, a user-friendly interface with which a user does not have to input information with the keyboard 118 is provided.

An exemplary case in which a one-dimensional barcode is merged into an image to be printed on a sheet of paper has been described. However, a two-dimensional barcode may be merged into an image. Since a two-dimensional barcode can store a larger amount of information than a one-dimensional barcode, the two-dimensional barcode can store not only information about an image capturing date and time but also information a user will probably desire. Accordingly, for example, after relevant information stored as a two-dimensional barcode has been displayed on the display section 120, other relevant information may be retrieved in the image information DB 60, be acquired, and be displayed when the display of additional information is instructed.

In the above-described exemplary case, the image information DB 60 in which image data and relevant information are registered is included in the image information management section 32 realized by the server 58. For example, the image information DB 60 may be included in the storage unit 46 in the computer 40 functioning as the image printing device 10 or the storage unit 116 in the computer 110 functioning as the image display device 90.

In the above-described exemplary case, the image printing device 10 is included in an information apparatus such as a PC connected to a printing apparatus such as a printer. However, for example, the image printing device 10 may be included in the printing apparatus such as a printer. In the above-described exemplary case, the image display device 90 is included in a mobile terminal such as a mobile telephone. However, the image display device 90 may be included in an image capturing apparatus such as a digital camera.

In the above-described exemplary case, the image printing program 64 that is an example of an image printing program according to an embodiment of the present disclosure is stored in the storage unit 46 in advance and the image display program 130 that is an example of an image processing program according to an embodiment of the present disclosure is stored in the storage unit 116 in advance. However, an image printing program and an image processing program according to an embodiment of the present disclosure may be recorded in a recording medium such as a CD-ROM or DVD-ROM.

All references, patent applications, and technical standards described in this specification are herein incorporated by reference to the same extent as if such references, patent applications, and technical standards were specifically and individually indicated to be incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising:
a memory; and
a processor connected with the memory, to:
acquire image data and barcode data indicating a barcode including a high luminance part and a low luminance part,
set a region of the image data, the region including a plurality of pixels, and
change, for each of the plurality of pixels, a luminance value into another luminance value based on a determination as to whether each of the plurality of pixels correspond to the high luminance part or the low luminance part of the barcode data, a comparison between the luminance value and a value corresponding with a moving average level of luminance values associated with the region, and a luminance difference needed to distinguish the high luminance part and the low luminance part.

2. The image processing device according to claim 1, wherein:

line data of a line along a barcode reading direction in the region on the image is extracted, a smoothing processing is performed on the extracted line data, the smoothing processing removing a high-frequency component generated due to luminance change in a width shorter than a minimum width of any of the parts of the barcode corresponding to the high luminance part or the low luminance arranged along the barcode reading direction, a moving average level Yn_ave of luminance level Yn for n-th pixel in the line corresponding to the line data that has been subjected to the smoothing processing is calculated, a difference is detected between the luminance level Yn of the n-th pixel in the line corresponding to the line data that has been subjected to the smoothing processing and the moving average level Yn_ave and a minimum detectable difference, 2×Ymin, in luminance level between a high luminance part and an adjacent low luminance part of the barcode with which barcode reading can be performed, the luminance level of the n-th pixel corresponding to the high luminance part of the barcode to Yn_ave+Ymin is changed when Yn−Yn_ave≥Ymin is not satisfied, and the luminance level of the n-th pixel corresponding to the low luminance part of the barcode to Yn_ave−Ymin is changed when Yn_ave−Yn≥Ymin is not satisfied.

3. The image processing device according to claim 1, wherein information related to an image capturing date and time of the image is acquired, and the region represents the information.

4. The image processing device according to claim 1, wherein a one-dimensional barcode is merged into the region when a luminance value is changed.

5. The image processing device according to claim 1, a two-dimensional barcode into the region when a luminance value is changed.

6. The image processing device according to claim 1, wherein the high luminance part of the barcode exhibits a higher luminance in comparison with a luminance of the low luminance part of the barcode.

7. An image processing method executed by a computer comprising:

acquiring image data and barcode data indicating a barcode including a high luminance part and a low luminance part;

setting a region of the image data, the region including a plurality of pixels; and changing, for each of the plurality of pixels, a luminance value into another luminance value based on a determination as to whether each of the plurality of pixels correspond to the high luminance part or the low luminance part of the barcode data, a comparison between the luminance value and a value corresponding with a moving average level of luminance values associated with the region, and a luminance difference needed to distinguish the high luminance part and the low luminance part.

8. The image processing method according to claim 7, wherein the changing comprises:

extracting line data of a line along a barcode reading direction in the region on the image, performing, on the extracted line data, smoothing processing to remove a high-frequency component generated due to luminance change in a width shorter than a minimum width of any of the parts of the barcode corresponding to the high luminance part or the low luminance arranged along the barcode reading direction, calculating a moving average level Yn_ave of luminance level Yn for n-th pixel in the line corresponding to the line data that has been subjected to the smoothing processing, comparing a difference between the luminance level Yn of the n-th pixel in the line corresponding to the line data that has been subjected to the smoothing processing and the moving average level Yn_ave and a minimum detectable difference, 2×Ymin, in luminance level between a high luminance part and an adjacent low luminance part of the barcode with which barcode reading can be performed, changing the luminance level of the n-th pixel corresponding to the high luminance part of the barcode to Yn_ave+Ymin when Yn−Yn_ave≥Ymin is not satisfied, and changing the luminance level of the n-th pixel corresponding to the low luminance part of the barcode to Yn_ave−Ymin when Yn_ave−Yn≥Ymin is not satisfied.

9. The image processing method according to claim 1, comprising:

acquiring information related to an image capturing date and time of the image, wherein the region represents the information.

10. The image processing method according to claim 7, wherein the changing merges a one-dimensional barcode into the region.

11. The image processing method according to claim 7, wherein the changing merges a two-dimensional barcode into the region.

12. A computer-readable recording medium storing an image processing program causing a computer to execute a process for processing images, the process comprising:

acquiring image data and barcode data indicating a barcode including a high luminance part and a low luminance part;

setting a region of the image data, the region including a plurality of pixels; and changing, for each of the plurality of pixels, a luminance value into another luminance value based on a determination as to whether each of the plurality of pixels correspond to the high luminance part or the low luminance part of the barcode data, a comparison between the luminance value and a value corresponding with a moving average level of luminance values associated with the region, and a luminance difference needed to distinguish the high luminance part and the low luminance part.

13. The computer-readable recording medium according to claim 12, wherein the changing comprises:

extracting line data of a line along a barcode reading direction in the region on the image, performing, on the extracted line data, smoothing processing for removing a high-frequency component generated due to luminance change in a width shorter than a minimum width of any of the parts of the barcode corresponding to the high luminance part or the low luminance arranged along the barcode reading direction, calculating a moving average level Yn_ave of luminance level Yn for n-th pixel in the line corresponding to the line data that has been subjected to the smoothing processing, comparing a difference between the luminance level Yn of the n-th pixel in the line corresponding to the line data that has been subjected to the smoothing processing and the moving average level Yn_ave and a minimum detectable difference, 2×Ymin, in luminance level between a high luminance part and an adjacent low luminance part of the barcode with which barcode reading can be performed, changing the luminance level of the n-th pixel corresponding to the high luminance part of the barcode to Yn_ave+Ymin when Yn−Yn_ave≥Ymin is not satisfied, and changing the luminance level of the n-th pixel corresponding to the low luminance part of the barcode to Yn_ave−Ymin when Yn_ave−Yn≥Ymin is not satisfied.

14. The computer-readable recording medium according to claim 12, the process comprising:

acquiring information related to an image capturing date and time of the image, wherein the region represents the information.

15. The computer-readable recording medium according to claim 11, wherein the changing merges a one-dimensional barcode into the region.

16. The computer-readable recording medium according to claim 12, wherein the changing merges a two-dimensional barcode into the region.

* * * * *

UNITED STATES PATENT AND TRADEMARK OFFICE
CERTIFICATE OF CORRECTION

| | | |
|---|---|---|
| PATENT NO. | : 8,757,491 B2 | Page 1 of 1 |
| APPLICATION NO. | : 13/692484 | |
| DATED | : June 24, 2014 | |
| INVENTOR(S) | : Nobuyasu Yamaguchi | |

It is certified that error appears in the above-identified patent and that said Letters Patent is hereby corrected as shown below:

In the Claims

Column 17, Line 10-11, In Claim 14, Delete "according claim" and insert -- according to claim --, therefor.

Signed and Sealed this
Twenty-eighth Day of October, 2014

Michelle K. Lee
*Deputy Director of the United States Patent and Trademark Office*